(12) United States Patent
Huang et al.

(10) Patent No.: US 8,724,039 B2
(45) Date of Patent: May 13, 2014

(54) HYBRID MULTIPLEXED 3D DISPLAY AND DISPLAYING METHOD THEREOF

(75) Inventors: Kuo-Chung Huang, Taipei County (TW); Kuen Lee, Hsinchu (TW); Chao-Hsu Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1383 days.

(21) Appl. No.: 11/958,422

(22) Filed: Dec. 18, 2007

(65) Prior Publication Data

US 2008/0316378 A1 Dec. 25, 2008

(30) Foreign Application Priority Data

Jun. 23, 2007 (TW) ................................ 96122813 A

(51) Int. Cl.
*G02F 1/1335* (2006.01)
(52) U.S. Cl.
USPC ............................................. 349/15; 349/106
(58) Field of Classification Search
USPC ............................................. 349/15, 95, 106
See application file for complete search history.

(56) References Cited

U.S. PATENT DOCUMENTS

| | | |
|---|---|---|
| 1,128,979 A | 2/1915 | Hess |
| 1,992,872 A | 3/1934 | Mahler |
| 2,631,496 A | 8/1947 | Rehorn |
| 5,132,839 A | 7/1992 | Travis |
| 5,264,964 A | 11/1993 | Faris |
| 5,428,366 A * | 6/1995 | Eichenlaub ................... 345/102 |
| 5,506,705 A | 4/1996 | Yamamoto et al. |
| 5,777,588 A | 7/1998 | Woodgate et al. |
| 5,825,337 A | 10/1998 | Wiseman et al. |
| 5,831,765 A | 11/1998 | Nakayama et al. |
| 5,833,507 A | 11/1998 | Woodgate et al. |
| 5,973,831 A | 10/1999 | Kleinberger et al. |
| 6,046,849 A * | 4/2000 | Moseley et al. ............... 359/462 |
| 6,064,424 A | 5/2000 | van Berkel et al. |
| 6,172,723 B1 * | 1/2001 | Inoue et al. ..................... 349/95 |
| 6,271,896 B2 | 8/2001 | Moseley et al. |
| 6,351,280 B1 | 2/2002 | Benton |

(Continued)

FOREIGN PATENT DOCUMENTS

| | | |
|---|---|---|
| TW | 161577 | 6/1991 |
| TW | 381394 | 2/2000 |

(Continued)

OTHER PUBLICATIONS

English language translation of abstract of TW 200624869 (published Jul. 16, 2006).

(Continued)

*Primary Examiner* — Dung Nguyen
(74) *Attorney, Agent, or Firm* — McClure, Qualey & Rodack, LLP

(57) ABSTRACT

A hybrid multiplexed 3D display and a displaying method thereof. The hybrid multiplexed 3D display includes an image display, a light source and an image splitter. The image display generates a view image. The light source sequentially generates light of multiple colors transmitted through the image display. The image splitter disposed above or below the image display causes image data, which is generated after the light is transmitted through the image display, to emit toward two or more than two view directions. Thus, the image viewed by a user has at least two views to achieve a stereoscopic visual effect.

5 Claims, 14 Drawing Sheets

(56) References Cited

U.S. PATENT DOCUMENTS

| | | | |
|---|---|---|---|
| 6,715,885 B2 | 4/2004 | Hirose et al. | |
| 6,734,923 B2 | 5/2004 | Kwon et al. | |
| 6,816,207 B2 | 11/2004 | Jung | |
| 7,460,196 B2 * | 12/2008 | Kim et al. | 349/64 |
| 7,518,582 B2 | 4/2009 | Takatori et al. | |
| 7,646,438 B2 * | 1/2010 | Park et al. | 349/15 |
| 7,697,089 B2 * | 4/2010 | Yoon et al. | 349/65 |
| 2001/0001566 A1 | 5/2001 | Moseley et al. | |
| 2001/0007498 A1 | 7/2001 | Arai et al. | |
| 2002/0039229 A1 | 4/2002 | Hirose et al. | |
| 2004/0252272 A1 | 12/2004 | Takatori et al. | |
| 2006/0051109 A1 | 3/2006 | Lim et al. | |
| 2006/0125977 A1 | 6/2006 | Park et al. | |

FOREIGN PATENT DOCUMENTS

| | | |
|---|---|---|
| TW | 496967 | 8/2002 |
| TW | 200624869 | 7/2006 |
| TW | I275828 | 3/2007 |

OTHER PUBLICATIONS

English language translation of abstract of TW I275828 (published Mar. 11, 2007).

McAllister, D.F.; "Stereo Computer Graphics and Other True 3D Technologies;" Aug. 1993; pp. 108-111.

Non-Final Office Action issued by the USPTO for U.S. Appl. No. 13/232,666, filed Sep. 14, 2011, mailed Aug. 14, 2013.

"Three-Dimensional Displays" Stephen A. Benton, SPIE Milestone Series vol. MS162, May 9, 2001.

"Three-Dimensional Imaging Techniques" Takanori Okoshi, University of Tokyo Department of Electronic Engineering, 1976.

"The Design and Evaluation of a CRT-Based Autostereoscopic 3-D Display" A.R.L. Travis et al., Proceedings of the SID, vol. 32/4, 1991.

"Six-Primary-Color 23-in WXGA LCD Using Six-Color LEDs" Hiroaki Sugiura et al., SID 05 Digest, 2005.

"Three-Dimensional Television, Video, and Display Technologies" Bahram Javidi et al., Aug. 15, 2002.

"Sequential Color LCD Using No-Bias Bend Mode" Fion S.Y. Yeung et al., SID 07 Digest, 2007.

"A Roadmap for Autostereoscopic Multi-Viewer Domestic TV Displays" P. Surman et al., ICME 2006.

"Introduction of Natural Vision" Masahiro Yamaguchi, Imaging Science and Engineering Laboratory, Tokyo Institute of Technology, updated: Jan. 10, 2007.

"Foundations of the Stereoscopic Cinema: Chapter 2, Stereopsis and Stereoscopy" Lenny Lipton, pp. 53-59, Jul. 1982.

* cited by examiner

HYBRID MULTIPLEXED 3D DISPLAY AND DISPLAYING METHOD THEREOF This application claims the benefit of Taiwan application Serial No. 96122813, filed Jun. 23, 2007, the subject matter of which is incorporated herein by reference.

BACKGROUND OF THE INVENTION

1. Field of the Invention

The invention relates in general to a 3D display and a displaying method thereof, and more particularly to a hybrid multiplexed 3D display and a displaying method thereof.

2. Description of the Related Art

A display has become a most-important interface between the human and the technology. The technology of displaying a frame has been advanced toward the high resolution, the high image quality and the large scale. The next revolutionary advance of the display technology corresponds to the 3D image display converted from the 2D image display so as to satisfy the most important and natural stereoscopic visual effect in the human vision.

An autostereoscopic display will become the main direction in the future 3D display, and the autostereoscopic display developed toward the multi-view has become the necessary and essential trend. However, the main bottleneck of the current 3D image display technology resides in that the bandwidth is too high because the display has to modulate the colors, the brightnesses and the views simultaneously. Consequently, after the 3D display matches with the flat display technology, it is difficult to achieve the good display effect because too many spatial resolutions are sacrificed or the signal frequency is too high.

At present, the autostereoscopic displays may be classified into a temporal multiplexed display and a spatial multiplexed display. When the 3D image is to be displayed on a multi-view autostereoscopic display in a spatial multiplexed display manner, a lot of spatial resolutions of the display will be sacrificed, and the image quality of the single view of the viewer is greatly reduced. When the 3D image is displayed on the multi-view autostereoscopic display in a temporal multiplexed display manner, the technological problems that the brightness is seriously decreased and the frequency of the image signal is too high may occur although the spatial resolution of the image will not be decreased.

In order to overcome the above-mentioned problems, U.S. Pat. No. 6,351,280 and Taiwan Patent No. 381,394 have disclosed a viewer tracking autostereoscopic display. This display uses the viewer tracking system and can generate the required images of the views corresponding to the position according to the position of the viewer by way of optical modulation. This display needs not to generate many views simultaneously but still can achieve the object of the multi-view. Although this display cannot greatly reduce the spatial resolution of the single view, the cost and the size of the display are increased because the tracking system has to be used.

Thus, it is an important subject of the invention to achieve the high spatial resolution so that the autostereoscopic display, which has the quality of the 3D image that can be accepted by the user and the frequency of the signal that cannot be too high, can be obtained and the 3D display can enter the public market in a popular manner.

SUMMARY OF THE INVENTION

Examples of the present invention may provide a hybrid multiplexed 3D display. The hybrid multiplexed 3D display includes an image display, a light source and an image splitter is provided. The image display generates an image. The light source sequentially generates light of multiple colors transmitted through the image display. The image splitter is disposed above or below the image display, and causes image data, which is obtained after the light is transmitted through the image display, to emit toward two or more than two view directions so that the image viewed by a user has at least two views to achieve a stereoscopic visual effect.

Examples of the present invention may provide a method of displaying a hybrid multiplexed 3D image. The method includes the following steps: an image is generated by an image display; a light source sequentially generates light of multiple colors, which is sequentially transmitted through the image display; and an image splitter causes image data, which is obtained after the light is transmitted through the image display, to emit toward two or more than two view directions so that the image viewed by a user has at least two views to achieve a stereoscopic visual effect.

The invention will become apparent from the following detailed description of the preferred but non-limiting embodiments. The following description is made with reference to the accompanying drawings.

DETAILED DESCRIPTION OF THE INVENTION

Figure 1A:
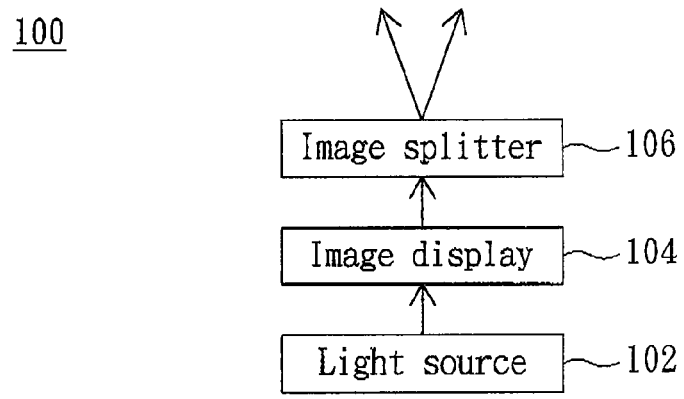
FIGS. 1A and 1B are schematic illustrations showing a hybrid multiplexed 3D display according to a preferred embodiment of the invention.
Figure 1B:
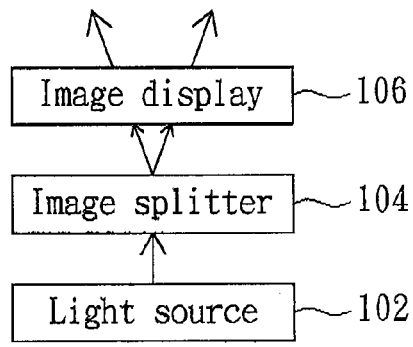

FIGS. 1A and 1B are schematic illustrations showing a hybrid multiplexed 3D display 100 according to a preferred embodiment of the invention. Referring to FIGS. 1A and 1B, the hybrid multiplexed 3D display 100 includes an image display 104, a light source 102 and an image splitter 106. The image display 104 generates an image. The light source 102 sequentially generates light of multiple colors, which is transmitted through the image display 104. The image splitter 106 is disposed above the image display 104, as shown in FIG. 1A, or below the image display 104, as shown in FIG. 1B. The image splitter 106 causes image data, which is obtained after the light is transmitted through the image display 104, to emit toward two or more than two view directions so that the image viewed by a user has at least two views to achieve a stereoscopic visual effect.

Figure 2:
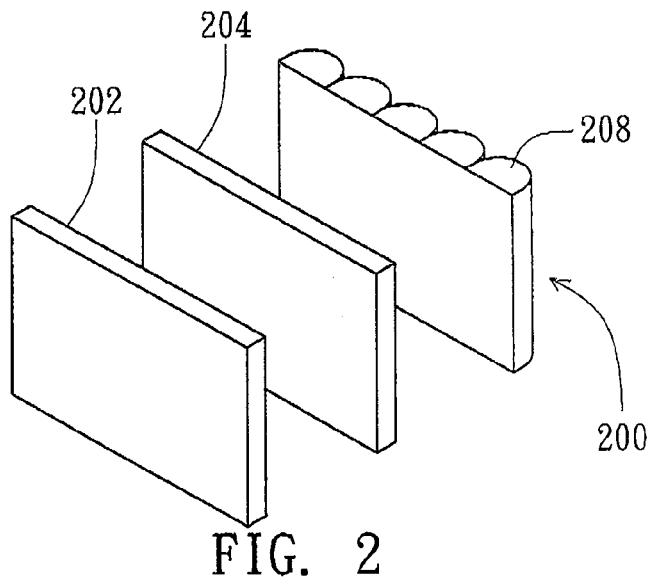
FIG. 2 is an exploded view showing an example of the hybrid multiplexed 3D display of FIG. 1A.

FIG. 2 is an exploded view showing an example of the hybrid multiplexed 3D display 100 of FIG. 1A. As shown in FIG. 2, the image display 104 in a hybrid multiplexed 3D display 200 may be a transmissive display panel 204, such as a transmissive liquid crystal display panel, having no color filter. The image display 104 may also be any other brightness modulator, such as a transmissive electro-optic modulator capable of modulating the light intensity. The transmissive display panel 204 has multiple pixels for generating the image. The light of the colors is sequentially transmitted through the pixels so that the pixels sequentially generate sub-images of the colors. The sub-images correspond to the image.

The light source 102, such as a sequential backlight module 202, sequentially generates the light of the colors. The light of the colors includes, for example, red, green and blue light rays. The light of the colors may also be a combination of other light rays of other colors. The red, green and blue light rays are sequentially transmitted through the pixels so that the pixels sequentially generate a red sub-image, a green sub-image and a blue sub-image, which are combined together to obtain the image.

The image splitter 106 may be, for example, an optical film having a lens array 208, which is composed of multiple rod-like convex lenses arranged longitudinally. However, the invention is not particularly restricted thereto, and any lens array 208, which can image the image onto different positions in the space by way of lens imaging so that the image viewed by the user has the at least two views, may be regarded as falling within the scope of the invention.

Figure 3A:
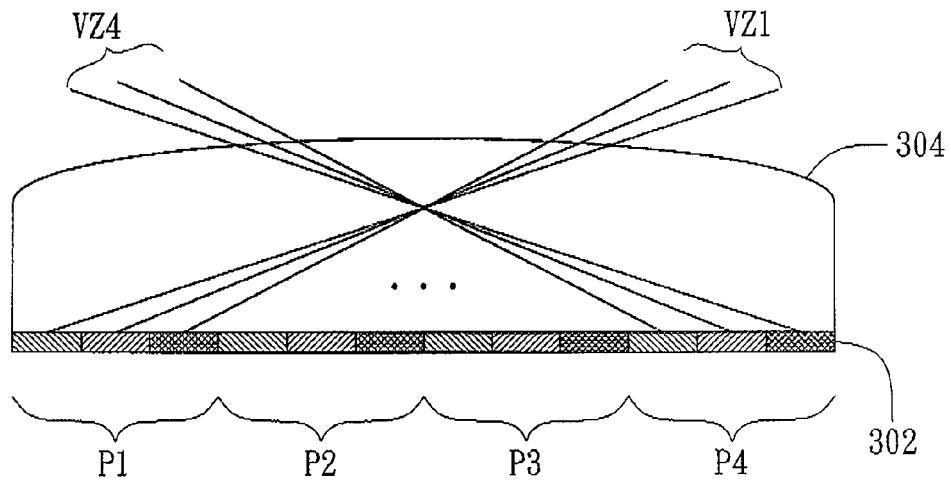
FIG. 3A (Prior Art) is a schematic illustration showing an operation of a spatial multiplexed 3D display according to the prior art.
Figure 3B:
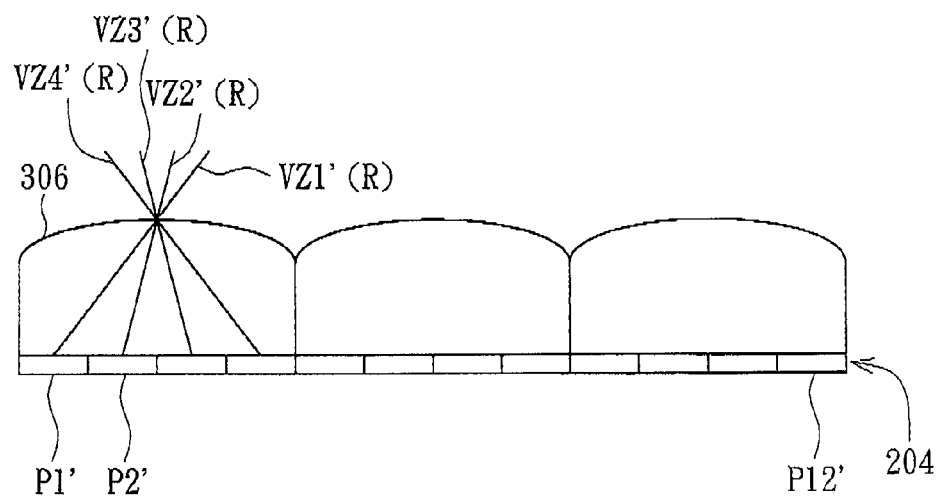
FIG. 3B is a schematic illustration showing an example of an operation of the hybrid multiplexed 3D display of the invention.

FIG. 3A (Prior Art) is a schematic illustration showing an operation of a spatial multiplexed 3D display according to the prior art. FIG. 3B is a schematic illustration showing an example of an operation of the hybrid multiplexed 3D display of the invention. It is assumed that each of the displays of FIGS. 3A and 3B has four views. However, the invention is not particularly limited thereto. That is, the display of the invention may also have two views or any number of views.

In FIG. 3A, a display panel 302 has many pixels, such as pixels P1, P2, P3 and P4. The pixels P1, P2, P3 and P4 constitute a 3D image pixel for respectively displaying the images of four views of the 3D image. Each pixel has a red sub-pixel SP_R, a green sub-pixel SP_G and a blue sub-pixel SP_B. A backlight module (not shown) outputs white light, which is transmitted through red, green and blue filters of three sub-pixels of the pixel P1 and then the red, green and blue light rays are respectively generated. The red, green and blue light rays are further refracted by a convex lens 304, and then the light ray VZ1 corresponding to a first view is generated. Similarly, the light rays emitted from the three sets of sub-pixels of the pixels P2, P3 and P4 are retracted by the convex lens 304, and then the light rays VZ2, VZ3 and VZ4 corresponding to a second view, a third view and a fourth view are generated. Thus, the user can view the color image having four views represented by the pixels P1, P2, P3 and P4.

In FIG. 3B, the transmissive display panel 204 has, for example, pixels P1', P2' . . . P12'. Assume an area of one of the pixels P1' to P12' is the same as an area of any sub-pixel of the pixels P1 to P4. The pixels P1' to P4' constitute a first 3D image pixel for displaying the image of one of the pixels of the 3D image of four views. The pixels P5' to P8' constitute a second 3D image pixel, and the pixels P9' to P12' constitute a third 3D image pixel. For example, the sequential backlight module (not shown in the drawing) sequentially outputs the red, green and blue light rays so that the pixel P1' sequentially generates the red, green and blue light rays with the corresponding brightness under the driving of the red, green and blue pixel voltages corresponding to the red, green and blue image data. Thus, the pixel P1' sequentially serves as the red, green and blue pixels at different time instants.

Illustration will be made by taking the red light ray as an example. At a first time instant, the red light ray emitted from the pixel P1' is refracted by a convex lens 306, and then the light ray VZ1' (R) corresponding to the first view is generated. Similarly, the red light rays emitted from the pixels P2', P3' and P4' are refracted by the convex lens 306 and then the red light rays VZ2'(R), VZ3'(R) and VZ4'(R) corresponding to the second view, the third view and the fourth view are generated. At a second time instant, the green light rays emitted from the pixels P1', P2', P3' and P4' are refracted by the convex lens 306, and then the green light rays VZ1' (G), VZ2'(G), VZ3'(G) and VZ4'(G) (not shown) corresponding to the first view, the second view, the third view and the fourth view are generated. At a third time instant, the blue light rays emitted from the pixels P1', P2', P3' and P4' are refracted by the convex lens 306, and then the blue light rays VZ1' (B), VZ2'(B), VZ3'(B) and VZ4'(B) (not shown) respectively corresponding to the first view, the second view, the third view and the fourth view are generated. Thus, the user may receive the light rays of three primary colors of the two views among the four views according to the phenomenon of persistence of vision of the human eyes so as to view the color 3D image represented by the pixels P1' to P4'.

As shown in FIGS. 3A and 3B, when the sub-pixel SP_R of the pixel P1 and the pixel P1' have the same area, the number of 3D image pixels in the hybrid multiplexed 3D display of this embodiment is three times that in the conventional spatial multiplexed 3D display when the display panel 302 and the transmissive display panel 204 have the same area. That is, the spatial resolution of the single view in the hybrid multiplexed 3D display of this embodiment is three times that in the conventional spatial multiplexed 3D display. Thus, compared with the conventional spatial multiplexed 3D display, the hybrid multiplexed 3D display of this embodiment has the advantage of increasing the spatial resolution of the single view when the number of views is kept constant.

Figure 4A:
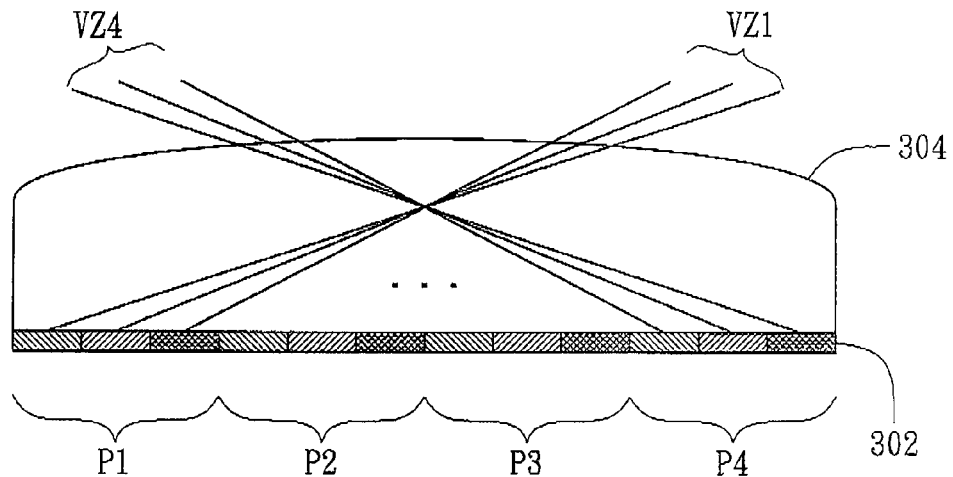
FIG. 4A (Prior Art) is a schematic illustration showing the operation of the spatial multiplexed 3D display according to the prior art.
Figure 4B:
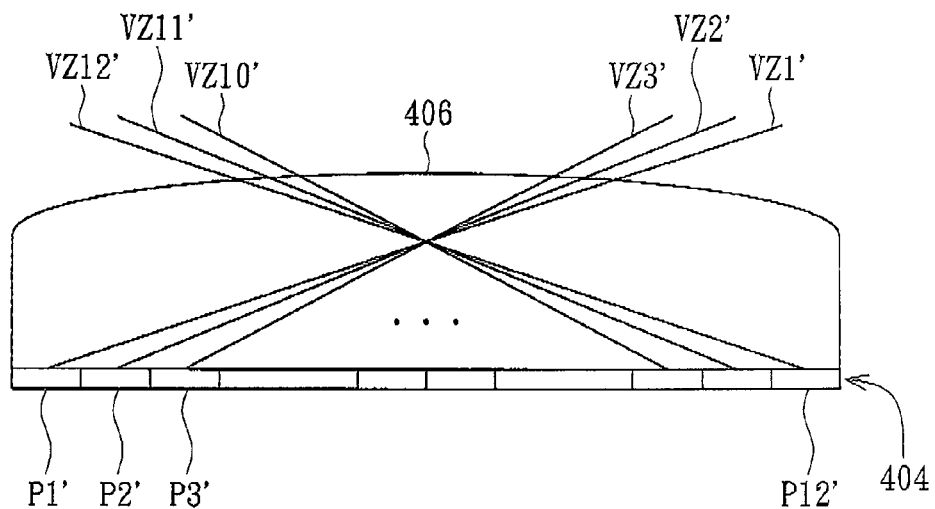
FIG. 4B is a schematic illustration showing another example of the operation of the hybrid multiplexed 3D display of the invention.

FIG. 4A (Prior Art) is a schematic illustration showing the operation of the spatial multiplexed 3D display according to the prior art. FIG. 4B is a schematic illustration showing another example of the operation of the hybrid multiplexed 3D display of the invention. Assume that the display of FIG. 4A has four views, and the display of FIG. 4B has 12 views.

The 3D display of FIG. 4A is the same as the 3D display of FIG. 3A and can display the color image with four views. In FIG. 4B, it is assumed that the area of one of the pixels P1' to P12' is also the same as the area of any sub-pixel of the pixels P1 to P4. The display panel 302 and a transmissive display panel 404 have the same area. In a condition that the spatial resolution of the single view in the hybrid multiplexed 3D display of this embodiment is the same as that in the conventional spatial multiplexed 3D display, the number of the views of this embodiment may be three times that of the conventional spatial multiplexed 3D display. In FIG. 4A, the pixels P1 to P4 constitute one 3D image pixel. In FIG. 4B, the display of this embodiment can make the pixels P1' to P12' constitute a 3D image pixel using one convex lens 406 so that the light rays VZ1', VZ2' ... VZ12' of 12 views in one 3D image pixel are generated. Consequently, the number of the views in the hybrid multiplexed 3D display of FIG. 4B may be indeed three times that in the conventional spatial multiplexed display of FIG. 4A.

Figure 5A:
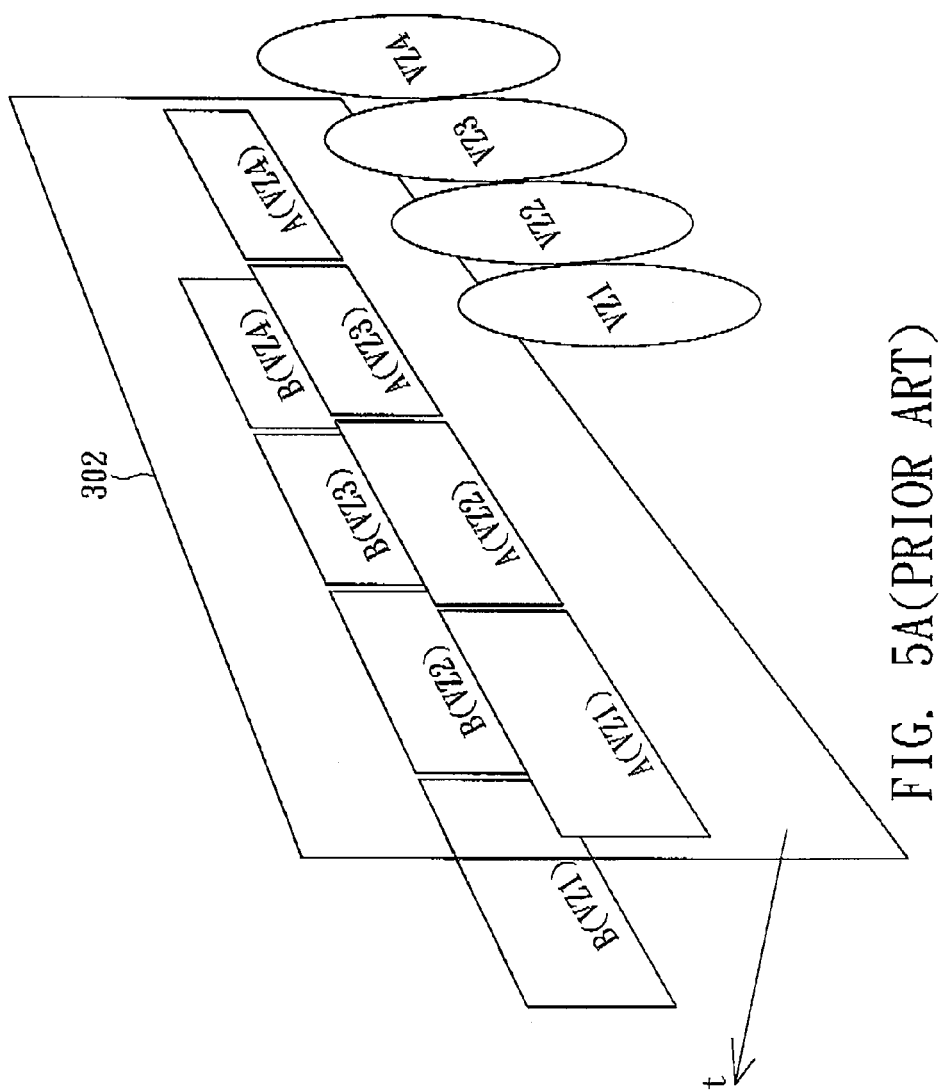
FIG. 5A (Prior Art) is a schematic illustration showing image data transmission of the spatial multiplexed 3D display with four views according to the prior art.
Figure 5B:
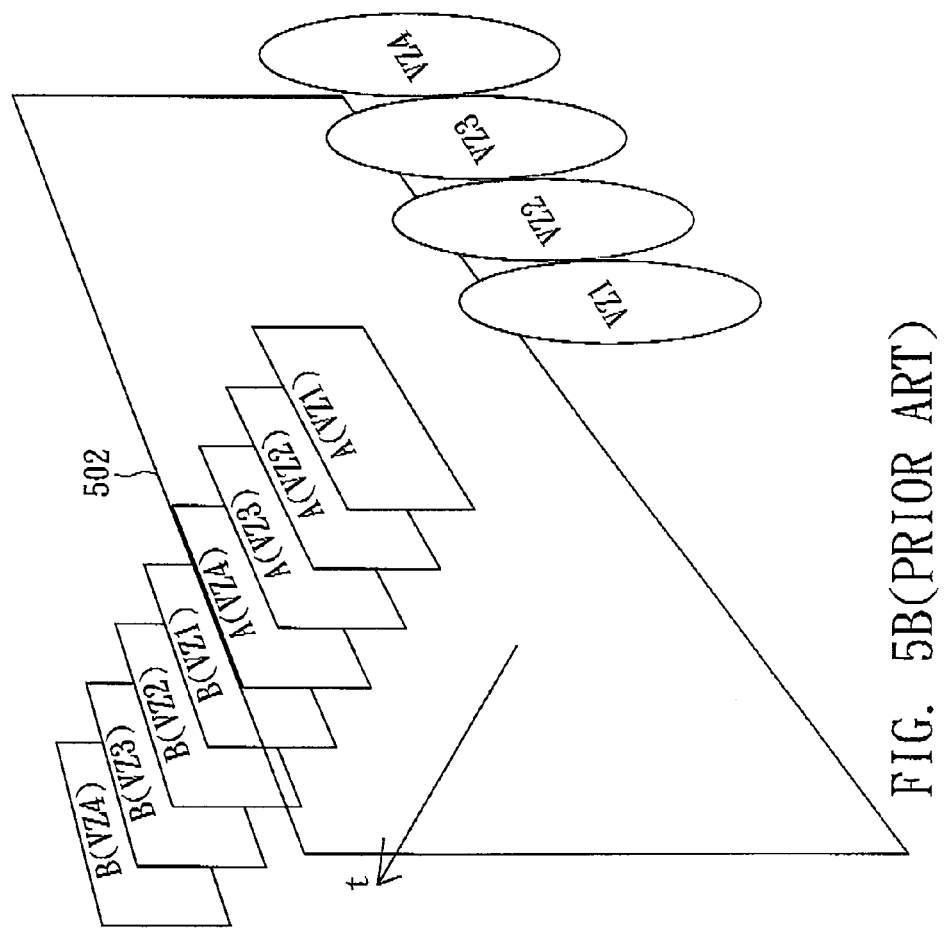
FIG. 5B (Prior Art) is a schematic illustration showing image data transmission of a temporal multiplexed 3D display with four views according to the prior art.
Figure 5C:
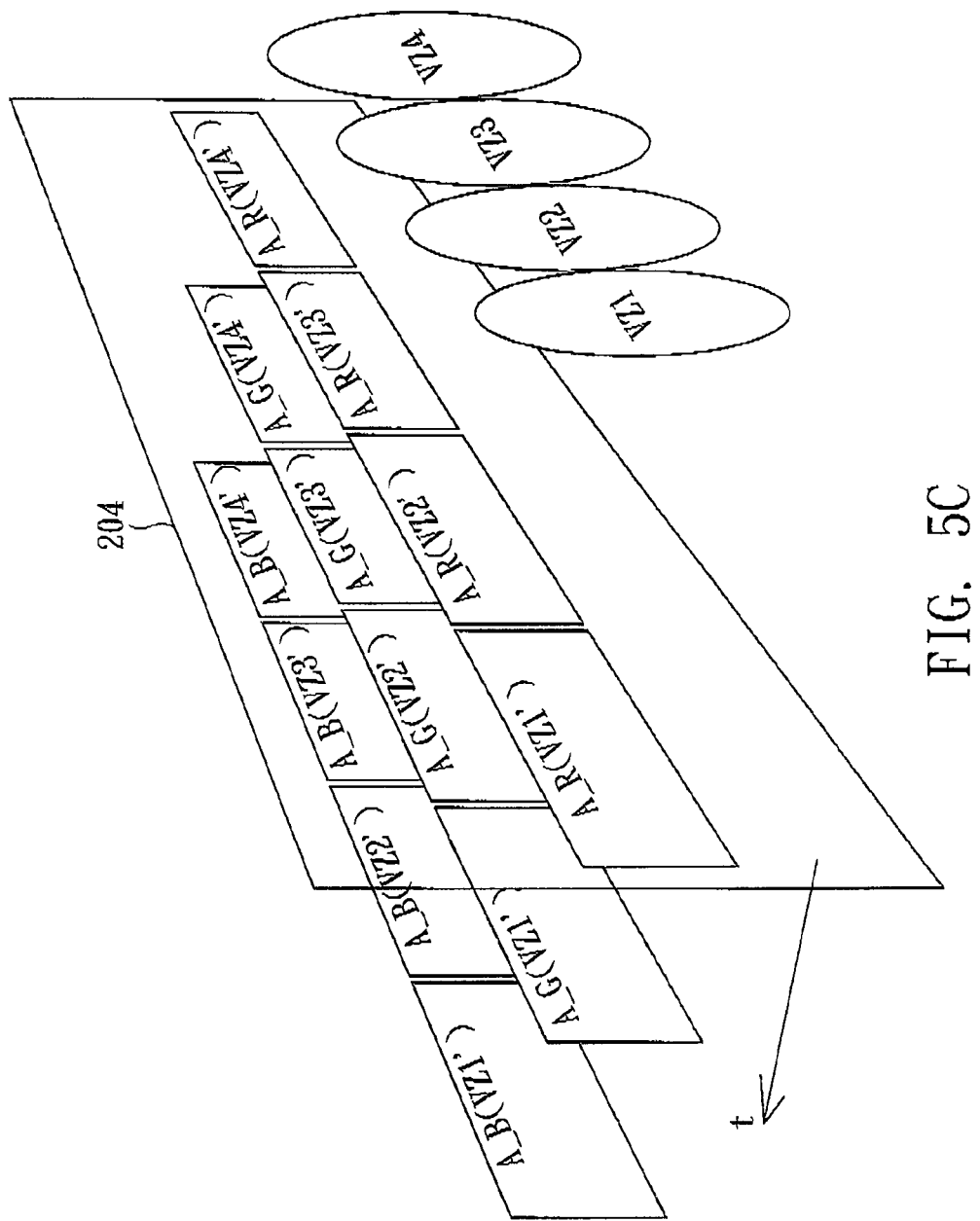
FIG. 5C is a schematic illustration showing image data transmission of the hybrid multiplexed 3D display with four views corresponding to FIG. 3B according to the invention.

FIG. 5A (Prior Art) is a schematic illustration showing image data transmission of the spatial multiplexed 3D display with four views according to the prior art. FIG. 5B (Prior Art) is a schematic illustration showing image data transmission of a temporal multiplexed 3D display with four views according to the prior art. FIG. 5C is a schematic illustration showing image data transmission of the hybrid multiplexed 3D display with four views corresponding to FIG. 3B according to the invention.

In FIG. 5A, the image data A(VZ1), A(VZ2), A(VZ3) and A(VZ4) of four views of the frame A may be simultaneously transmitted to the display panel 302. At the next time instant, the image data B(VZ1), B(VZ2), B(VZ3) and B(VZ4) of four views of the frame B may be transmitted to the display panel 302 simultaneously.

In FIG. 5B, the image data A(VZ1), A(VZ2), A(VZ3) and A(VZ4) of four views of the frame A are sequentially transmitted to a display panel 502 at different time instants, respectively. At the next four time instants, the image data B(VZ1), B(VZ2), B(VZ3) and B(VZ4) of four views of the frame B are sequentially transmitted to the display panel 502, respectively.

In FIG. 5C, the red image data A_R(VZ1'), A_R(VZ2'), A_R(VZ3') and A_R(VZ4') of four views of the frame A are transmitted to the display panel 204 simultaneously. At the next time instant, the green image data A_G(VZ1'), A_G(VZ2'), A_G(VZ3') and A_G(VZ4') of four views of the frame A are transmitted to the display panel 204 simultaneously. At still the next time instant, the blue image data A_B(VZ1'), A_B(VZ2'), A_B(VZ3') and A_B(VZ4') of four views of the frame A are simultaneously transmitted to the display panel 204. Compared with the conventional temporal multiplexed 3D display of FIG. 5B, the hybrid multiplexed 3D display of this embodiment of FIG. 5C has the lower image data updating frequency. More particularly, when the difference between the numbers of views is higher, the difference therebetween becomes more obvious.

Figure 6A:
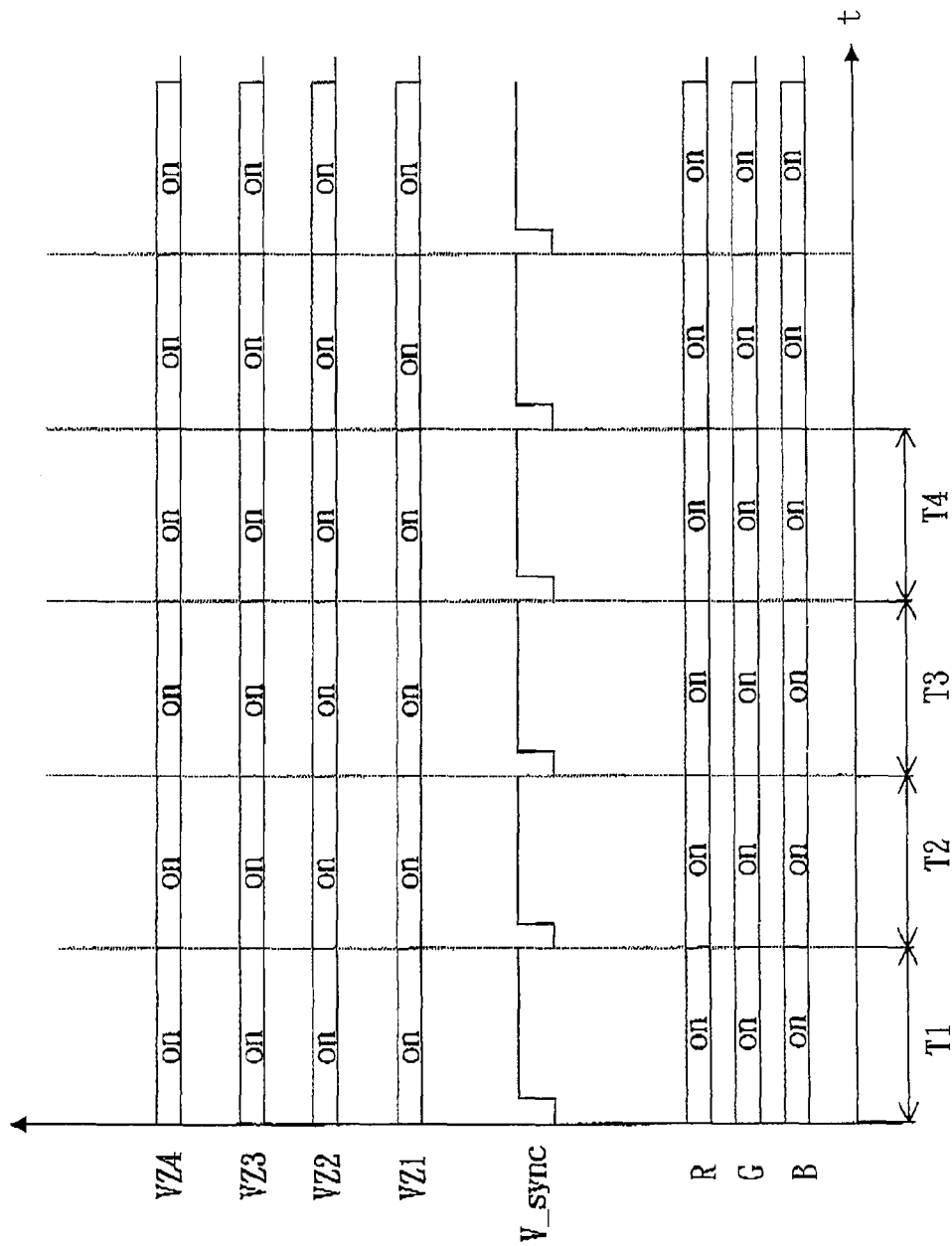
FIG. 6A (Prior Art) shows signal waveforms in the spatial multiplexed 3D display with four views according to the prior art.
Figure 6B:
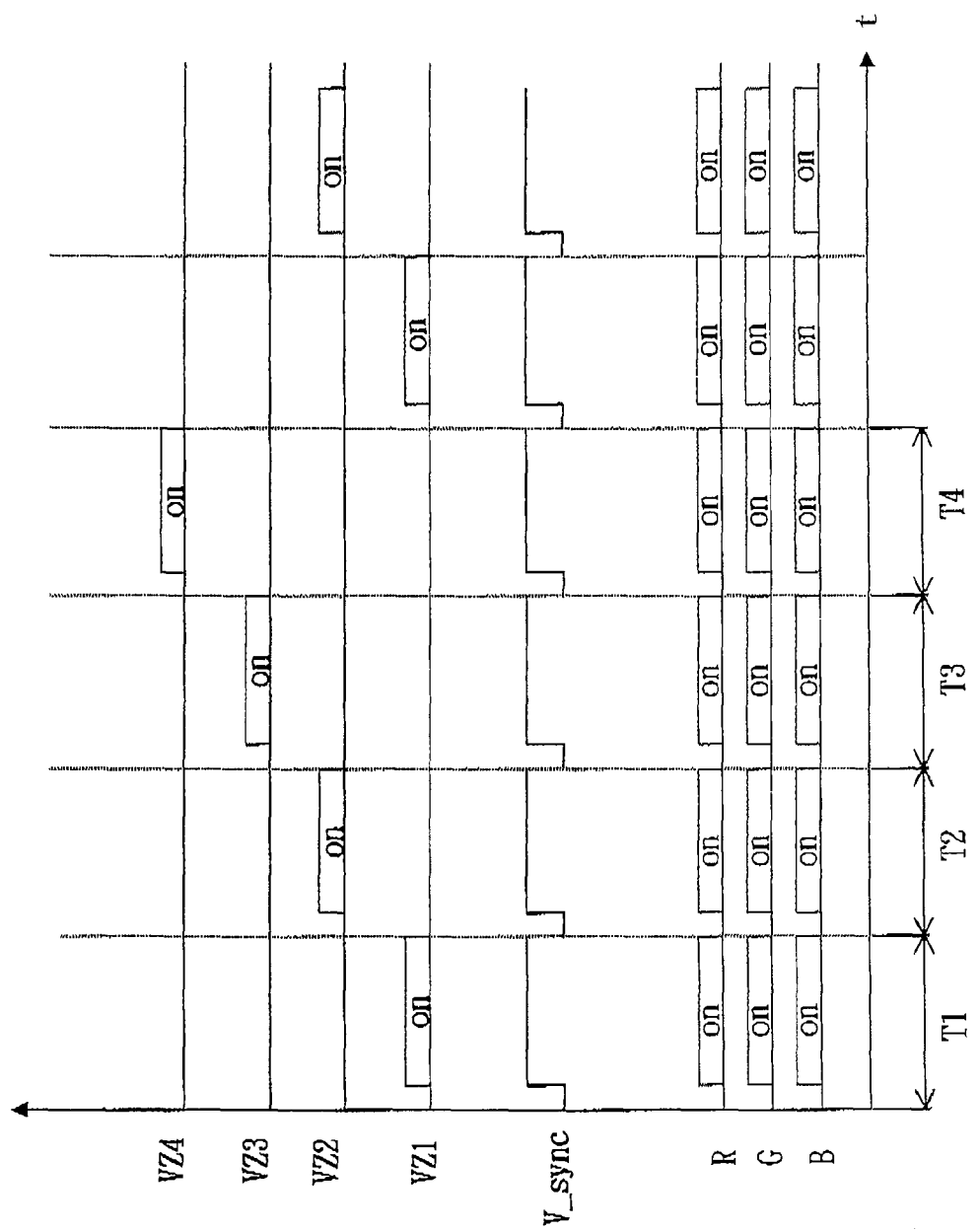
FIG. 6B (Prior Art) shows signal waveforms in the temporal multiplexed 3D display with four views according to the prior art.
Figure 6C:
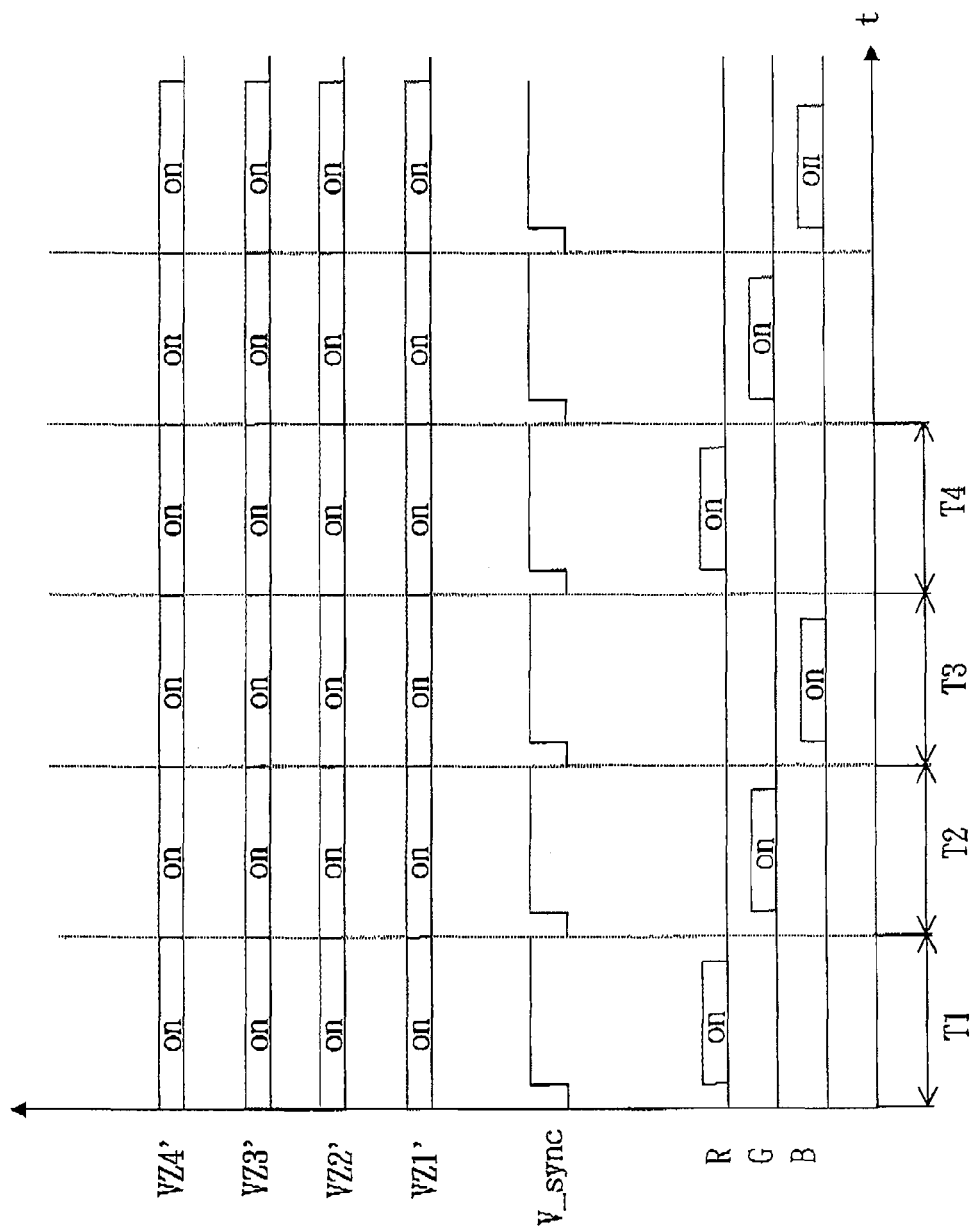
FIG. 6C shows signal waveforms in the hybrid multiplexed 3D display with four views corresponding to FIG. 3B according to the invention.

FIG. 6A (Prior Art) shows signal waveforms in the spatial multiplexed 3D display with four views according to the prior art. FIG. 6B (Prior Art) shows signal waveforms in the temporal multiplexed 3D display with four views according to the prior art. FIG. 6C shows signal waveforms in the hybrid multiplexed 3D display with four views corresponding to FIG. 3B according to the invention. As shown in FIGS. 6A, 6B and 6C, V_sync represents the vertical sync signal of the display panel, and R, G, B respectively represent the red, green and blue light rays outputted from the display panel.

As shown in FIG. 6A, the display panel of the spatial multiplexed 3D display generates the red light ray R, the green light ray G and the blue light ray B in the time period T1 simultaneously. The light ray VZ1 of the first view, the light ray VZ2 of the second view, the light ray VZ3 of the third view, and the light ray VZ4 of the fourth view are also generated simultaneously.

As shown in FIG. 6B, the display panel of the temporal multiplexed 3D display generates the red light ray R, the green light ray G and the blue light ray B in the time period T1 simultaneously. The light ray VZ1 of the first view, the light ray VZ2 of the second view, the light ray VZ3 of the third view and the light ray VZ4 of the fourth view are generated in the time periods T1, T2, T3 and T4, respectively. That is, a certain pixel generates the light rays VZ1 to VZ4 of different views in the different time periods T1, T2, T3 and T4.

As shown in FIG. 6C, the display panel of the hybrid multiplexed 3D display of this embodiment generates the red light ray R, the green light ray G and the blue light ray B in the time periods T1, T2 and T3, respectively. The light ray VZ1' of the first view, the light ray VZ2' of the second view, the light ray VZ3' of the third view and the light ray VZ4' of the fourth view, which correspond to the first view of the sub-frame of the same color, are generated simultaneously.

As shown in FIGS. 6A to 6C, compared with the spatial multiplexed 3D display, in which a full image display frame, being a full-color frame, may be seen at a single time and in a single view, only a portion of the image display frame, being a single color frame, is seen at a single time and in a single view in this embodiment. The hybrid multiplexed 3D display combines view modulation in space domain and color modulation in time domain. Thus, the embodiment has the advantages of spatial modulation and time modulation.

In FIG. 5A, the area of one of the pixels P1' to P12' is the same as the area of any sub-pixel of the pixels P1 to P4 in FIG. 3B. In the visible range that cannot be recognized by the human eyes, if the spatial resolution of the single view of the hybrid multiplexed 3D display of this embodiment can be slightly lowered, the area of one of the pixels P1' to P12' is also configured to be larger than the area of any sub-pixel of the pixels P1 to P4. Taking the pixels P1 and P1' as an example, the area of the pixel P1' may be smaller than the area of the pixel P1, and the area of the pixel P1' may be greater than one third of the area of the pixel P1. The horizontal width of the pixel P1' is smaller than the horizontal width of the pixel P1, and the horizontal width of the pixel P1' is greater than one third of the horizontal width of the pixel P1.

When the area of the pixel P1' is larger than the area of any sub-pixel of the pixel P1, the aperture ratio of the pixel P1' may be greater than the aperture ratio of any sub-pixel of the pixel P1. Thus, a dead-view zone generated in an opaque zone between the pixel P1' and its neighboring pixel in the image viewed by the user is reduced.

Figure 9:
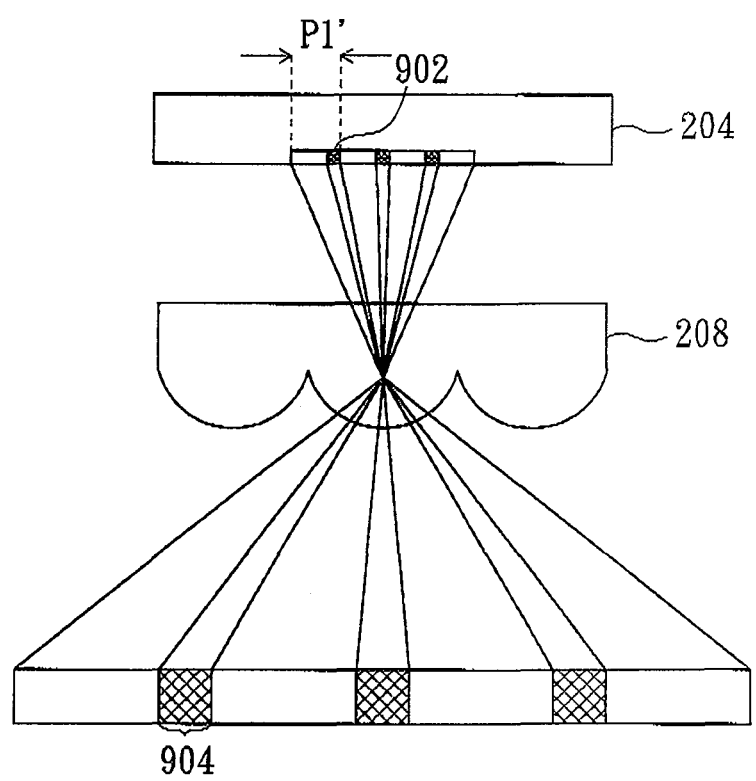
FIG. 9 is a schematic illustration showing a non-emissive region on the image display corresponding to a dead-view zone on a view according to an example.

FIG. 9 is a schematic illustration showing a non-emissive region on the image display corresponding to a dead-view zone on a view according to an example. As shown in FIG. 9, when an opaque zone 902 between the pixel P1' and its neighboring pixel is reduced, a dead-view zone 904 corresponding to the opaque zone 902 is reduced so that the image quality can be enhanced.

Figure 7:
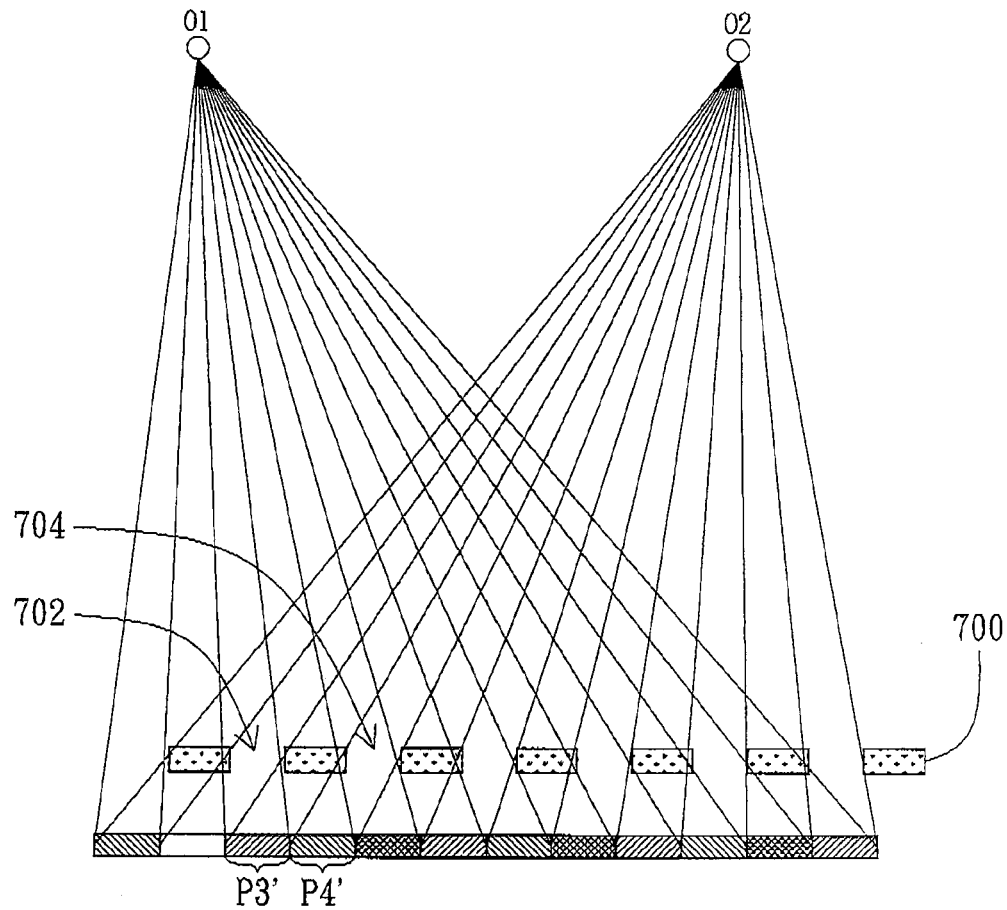
FIG. 7 is a schematic illustration showing the hybrid multiplexed 3D display of the invention having an optical film with pinholes to serve as an image splitter.

In addition, the image splitter 106 may also be achieved by an optical film 700 having pinholes, as shown in FIG. 7. The image splitter 106 may also be referred to as a pinhole/screened image splitter, which images an image onto different positions in the space by way of pinhole imaging so that the image viewed by the user has at least two views. For example, the light rays (red, green or blue light rays) emitted from the pixels P3' and P4' are transmitted through the pinholes 702 and 704 and emit toward the positions O1 and O2 so that the two different views are formed.

More particularly, the image splitter 106 may also be achieved by a color filter.

Figure 8A:
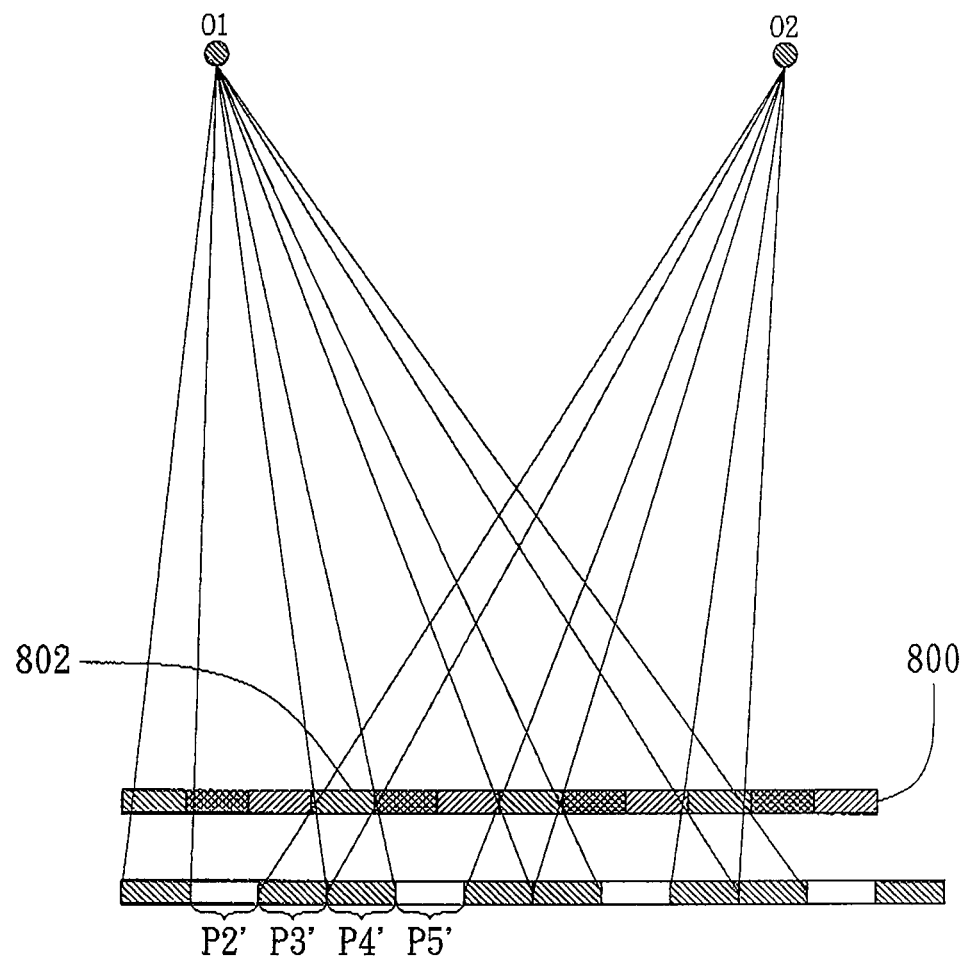
FIGS. 8A to 8C are schematic illustrations showing another example of the hybrid multiplexed 3D display when the image splitter is achieved by a color filter and the pixels respectively represent a red sub-frame, a green sub-frame and a blue sub-frame.
Figure 8B:
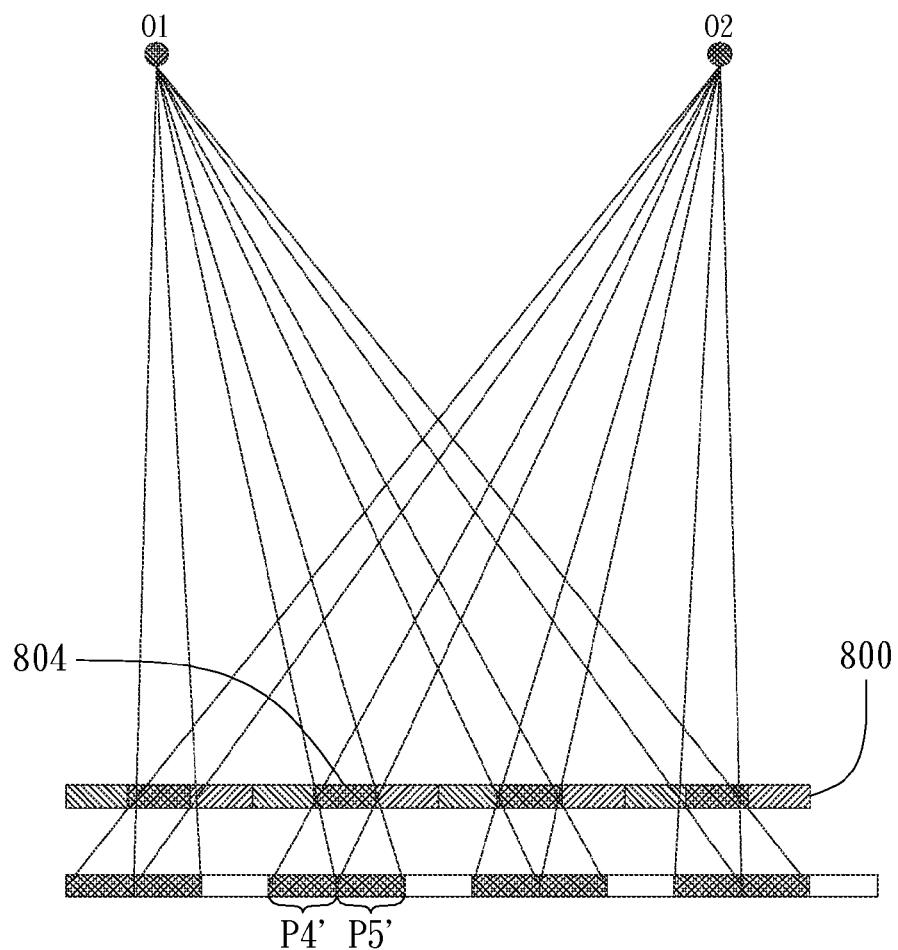
Figure 8C:
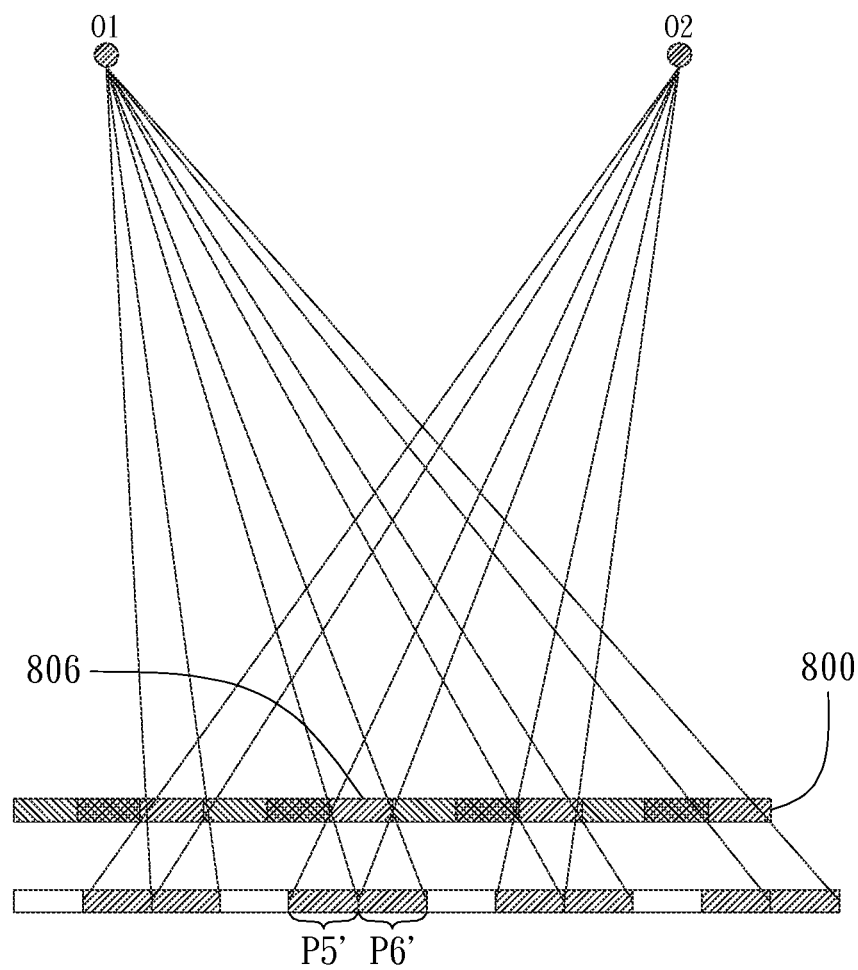

FIGS. 8A to 8C are schematic illustrations showing another example of the hybrid multiplexed 3D display when the image splitter 106 is achieved by a color filter 800 and the pixels respectively represent a red sub-frame, a green sub-frame and a blue sub-frame. The color filter 800 has many filtering units, such as 802, 804 and 806. The neighboring filtering units respectively have different colors. The number of the colors of these filtering units is the same as the number of the colors of the light rays. In this embodiment, the number of the colors of the filtering units is 3. The filtering unit may be a red filtering unit, a green filtering unit or a blue filtering unit, which are arranged in sequence.

The light transmitted through the neighboring two pixels is transmitted through one neighboring filtering unit corresponding to the color of light so that the image viewed by the user has at least two views. The pixels P3' and P4' will be illustrated in the example. As shown in FIG. 8A, when the display panel displays the red sub-frame, the red light rays emitted from the pixels P3' and P4' are transmitted through the red filtering unit 802 and reach the positions O1 and O2 to form two different views, respectively. As shown in FIG. 8B, when the display panel displays the green sub-frame, the green light rays emitted from the pixels P4' and P5' are transmitted through the green filtering unit 804 and reach the positions O1 and O2 to form two different views, respectively. As shown in FIG. 8C, when the display panel displays the blue sub-frame, the blue light rays emitted from the pixels P5' and P6' are transmitted through the blue filtering unit 806 and reach the positions O1 and O2 to form two different views, respectively. The red filtering unit 802, the green filtering unit 804 and the blue filtering unit 806 are arranged in sequence.

Opaque pixels may be disposed on sides of two neighboring red pixels. For example, the opaque pixels P2' and P5' are respectively disposed on two sides of the two neighboring red pixels P3' and P4'. The opaque pixels P2' and P5 turn into dark states after the red image data corresponding to a dark state is transmitted to the pixels P2' and P5'. Thus, the interference between the images of different views may be reduced.

The image splitter using the color filter may achieve the effect similar to the pinhole of the optical film according to the property that the light with the specific color only can be transmitted through the filtering unit with the specific color.

The hybrid multiplexed 3D display according to the embodiment of the invention may have the following advantages. Compared with the conventional spatial multiplexed 3D display, the hybrid multiplexed 3D display of this invention may have the higher single view resolution, or the number of views that may be split by the image splitter is greater so that the display has more views. Thus, the 3D image quality can be enhanced. Furthermore, adjusting the pixel size and reducing the non-emissive region can increase the aperture ratio of the pixel and increase the brightness.

When the resolution of the single view is increased, the optical interference between the image display and the image splitter may be effectively reduced. When the number of views is increased, the motion parallax can be modulated more easily and the viewer can view the image in the correct view more easily. Thus, the viewing quality can be effectively enhanced.

In addition, the pixel of the display panel of the invention may greatly increase the brightness of the display panel without any color filter. Furthermore, the hybrid multiplexed 3D display of the invention can achieve autostereoscopic display having the high spatial resolution and the signal frequency that is not too high without the use of the viewer tracking system so that the product competitiveness thereof is very high. More particularly, compared with the conventional spatial multiplexed 3D display, the invention may be implemented in a super multi-view 3D display/hologram-like 3D display more easily.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A hybrid multiplexed 3D display, comprising:
   an image display for generating an image;
   a light source for sequentially generating a plurality of light rays of different colors transmitted through the image display; and
   an image splitter, disposed above or below the image display, for causing image data, which is obtained after the light is transmitted through the image display, to emit toward two or more than two view directions so that the image viewed by a user has at least two views to achieve a stereoscopic visual effect, wherein the image splitter is a color filter having a plurality of filtering units, neighboring ones of the filtering units respectively have different colors, and the light transmitted through neighboring two of the pixels is transmitted through neighboring one of the filtering units corresponding to the color of the light so that the image has the at least two views.

2. The display according to claim 1, wherein the image display is a transmissive display panel, which has no color filter but has a plurality of pixels for generating the image, and the light rays of different colors are sequentially transmitted through the pixels so that the pixels sequentially generate a plurality of sub-images of the different colors, and the sub-images correspond to the image.

3. The display according to claim 2, wherein the transmissive display panel is a transmissive liquid crystal display panel or a transmissive electro-optic modulator capable of modulating light intensity, and the light source is a sequential backlight module for sequentially generating the light rays of different colors.

4. The display according to claim 1, wherein the light rays of different colors includes red, green and blue light rays.

5. The display according to claim 1, wherein the number of the colors of the filtering units is the same as the number of the colors of the light rays.

* * * * *